United States Patent [19]

Mathis et al.

[11] 4,445,941

[45] May 1, 1984

[54] PROCESS FOR CLEANING METAL SURFACES

[75] Inventors: Ronald D. Mathis; Jerry O. Reed, both of Bartlesville, Okla.

[73] Assignee: Phillips Petroleum Company, Bartlesville, Okla.

[21] Appl. No.: 401,033

[22] Filed: Jul. 22, 1982

[51] Int. Cl.³ .............................................. C23G 5/02
[52] U.S. Cl. ........................................ 134/3; 134/28; 134/38; 134/41
[58] Field of Search ...................... 134/28, 30, 41, 38, 134/3, 2; 252/174.23; 524/371

[56] References Cited

U.S. PATENT DOCUMENTS 3,369,935  2/1968  Booth et al. ........................ 134/28
4,118,363  10/1978 Smith ................................ 524/371

FOREIGN PATENT DOCUMENTS 58-03615  1/1983  Japan .

*Primary Examiner*—S. Leon Bashore, Jr.
*Assistant Examiner*—K. M. Hastings

[57] ABSTRACT

A process for the removal of poly(arylene sulfide) deposits on metal surfaces is provided by contacting the deposit with at least one diaryl ether under temperature conditions and for a time sufficient to remove said poly(arylene sulfide) deposits. A process for the cleansing of metal parts having poly(arylene sulfide) deposits is also provided which comprises treatment with a diaryl ether, and thereafter contacting the ether treated part with an alcohol, washing the part with water, drying the part, and thereafter contacting the dried part with concentrated $HNO_3$ followed by water washing and drying.

9 Claims, No Drawings

PROCESS FOR CLEANING METAL SURFACES

This invention relates to a process for cleaning metal surfaces containing poly(arylene sulfide) based deposits. In addition, this invention relates to a process for cleaning metal surfaces to remove not only poly(arylene sulfide) deposits but other contaminants as well.

In the production of poly(arylene sulfide) polymers various impurities such as polymer gel and inorganic materials are sometimes present in the polymer and can deposit on the surfaces of the production equipment. In addition, deposits derived from the polymer can also form during subsequent processing of the polymer, such as in synthetic fiber production. Thus the machine parts utilized in processing the produced polymer which have poly(arylene sulfide) deposits and/or other impurities must be cleaned for re-use. Such parts include spinnerettes, dies, pack parts, and filters.

In the past such poly(arylene sulfide) deposits have been removed mechanically, but the job is tedious and time consuming due to the complexity of the equipment. Also, attempts to remove the deposits by "burn out" procedures where the metal parts containing the deposits are placed in a forced air furnace and extreme heat applied, have been made. However, this "burn out" procedure is not suitable for removing deposits from metal surfaces since the burn out caused corrosion on the metal surface. Therefore, a process which will readily remove the deposits without having a corrosive or other deleterious effect on processing equipment is desirable.

In addition to the poly(arylene sulfide) deposits, contaminants present in the polymer such as metal oxides and calcium and magnesium salts are often deposited on the metal surfaces. Their removal is also desirable in order to give a clean surface.

It is therefore an object of this invention to provide a process for removing deposits derived from poly(arylene sulfides) from metal surfaces. It is a further object of this invention to provide a process for the cleaning of metal parts having poly(arylene sulfide) deposits thereon.

Other aspects, objects and the several advantages of the present invention will become apparent from this specification and the claims.

In accordance with the present invention, we have discovered that poly(arylene sulfide) deposits on metal surfaces can be removed by contacting the deposits with at least one diaryl ether, represented by the general formula

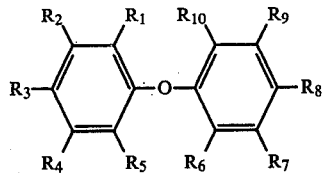

where $R_1$–$R_{10}$ represents hydrogen or an alkyl radical having from 1 to 4 carbon atoms with the total number of carbon atoms present in $R_1$–$R_{10}$ exceeding not more than 20, under temperature conditions and for a period of time sufficient to remove said deposits.

In accordance with another embodiment of this invention we have discovered that metal parts having poly(arylene sulfide) deposits thereon may be cleaned by contacting the metal parts with at least one diaryl ether in the manner stated above in the first embodiment, and thereafter contacting the resulting ether treated part with a $C_1$ to $C_5$ alcohol, washing the parts with water, drying the parts, and thereafter treating the dried parts with concentrated $HNO_3$.

Examples of diaryl ethers suitable for use in the process of this invention include diphenyl ether, 1-methyl diphenyl ether, 1,6-dimethyl diphenyl ether, decamethyl diphenyl ether, and 1,6-didecyl diphenyl ether.

The term "poly(arylene sulfide) polymer" as used in this specification is intended to include polymers of the type which are prepared as described in U.S. Pat. No. 3,354,129 and U.S. Pat. No. 3,919,177. As disclosed in U.S. Pat. No. 3,354,129, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention are those polymer having the repeating unit —R—S— where R is phenylene, biphenylene, naphthylene, biphenylene ether, or a lower alkyl-substituted derivative thereof. By "lower alkyl" is meant alkyl groups having one to six carbon atoms such as methyl, propyl, isobutyl, n-hexyl, etc. Polymer can also be made according to a process utilizing a p-dihalobenzene, an alkali metal sulfide, an organic amide, and an alkali metal carboxylate as in U.S. Pat. No. 3,919,177.

In the process of the present invention, the particular poly(arylene sulfide) deposit to be removed, particularly poly(phenylene sulfide) based deposits, is contacted with at least one diaryl ether of the formula given above. Contact between the deposit and the diaryl ether should be under temperatures conditions and for a period of time sufficient to remove said deposits. Generally, the temperature should be in the range from about 200° C. up to the boiling point of the diaryl ether and preferably, between about 200° C. and about 400° C. The contact time should be from about 0.5 to 24 hours.

After contact with the diaryl ether sufficient to remove the poly(arylene sulfide) deposits, it is preferred that the metal surfaces which contained the deposits should be contacted with a $C_1$ to $C_5$ alcohol, preferably methanol, to remove any diaryl ether.

In another preferred embodiment of the present invention, the metal surfaces are subsequently contacted with water, then dried, and then treated with concentrated $HNO_3$ to remove any remaining contaminants, such as metal oxides and Ca and Mg salts, remaining on the surfaces.

In another embodiment of this invention, metal parts having poly(arylene sulfide) deposits and other contaminants may be cleaned by treatment of the deposits with at least one diaryl ether as in the first embodiment of this invention, followed by treatment with a $C_1$ to $C_5$ alcohol and thereafter washing the parts with $H_2O$, air drying the parts at a temperature of at least 100° C., treating them with concentrated $HNO_3$ and again washing with water and drying. As the examples illustrate, this process results in a particularly enhanced removal of poly(arylene sulfide) as well as other contaminants.

In order to provide a clearer understanding of the present invention, but without limiting the scope thereof, the following examples are presented.

EXAMPLE I

Poly(phenylene sulfide) (PPS) prepared according to U.S. Pat. No. 3,919,177 and having a melt flow between 200 and 400 grams/10 minutes as measured according to ASTM D 1328 modified to a temperature of 315° C. and to the use of a 5 Kg. load was extruded at about 300° C. through a screen pack comprised of 4 stainless steel filter medias (1.56 inches diameter) consisting of one of each of 40, 80, and 200 mesh screens placed on top of Dynalloy X13L filter media (sintered micronic stainless steel fibers). After several hours extrusion, the screen pack was removed and immersed in 240 milliliters of diphenyl ether at 250° C. for 4 hours. At this point the screen pack was weighed and it was calculated that about 79 percent of the PPS-contaminant deposits had been removed.

The screens were then removed from the hot ether solution and soaked in methanol at 25° C. for 1 hour to remove diphenyl ether. The screens were then water soaked at 25° C. for 1 hour, air dried at 110° C., treated with concentrated $HNO_3$ for about 30 minutes at 25° C. to remove any remaining contaminants, water washed and dried. The screen packs were again weighed and it was calculated that about 95 percent of the PPS-contaminants had been removed. In addition, the stainless steel surfaces were essentially free of diphenyl ether and other contaminants as well.

Diphenyl ether was also successful in removing residual PPS-contaminant from breaker plates when cleaned in a similar manner as described.

The cleaning process for the screen packs was again repeated using other cleaning solvent systems as noted in Table 1. None of these systems were successful in removing any significant amount of residual PPS-contaminant.

TABLE I

| Cleaning Agent | Temp °C. | Time, Hrs. | Results |
| --- | --- | --- | --- |
| Triethylene Glycol | 250 | 4 | No apparent removal of PPS |
| Triethanolamine | 250–260 | 6 | No apparent removal of PPS |
| Ethanolamine | 170 | 6 | No apparent removal of PPS |

This example illustrates that diphenyl ether is a superior cleaning agent for PPS compound to other agents tested. Furthermore, the treatment with methanol followed by water treatment, air drying at an elevated temperature and subsequent contact with concentrated $HNO_3$ result in metal surfaces further free of PPS and other contaminants.

EXAMPLE II

Poly(phenylene sulfide) (PPS) as described in Example I was extruded at about 300° C. through a filter cartridge (identified as Dynalloy X8L) which consisted of a 7.5 inches×1.55 inches O.D. pleated cylinder with an inner and outer stainless steel support screen (equivalent to about a 40 mesh size) and an inner fine filter media comprising sintered micronic stainless steel fibers, said media having a 16 micron filter rating. After several hours operation, the filter cartridge was removed, soaked in refluxing diphenyl ether at about 250° C. for 16 hours under a nitrogen atmosphere and then further cleaned in the same manner described in Example I.

After treatment with diphenyl ether, the filter cartridge was essentially free of PPS and showed only very little black and brown particulate matter in the pleats of the filter. The additional treatment with methanol and concentrated nitric acid as in Example I, further removed PPS and other contaminants as well.

Reasonable variations and modifications are possible within the scope of the present invention without departing from the spirit thereof.

We claim:

1. A process for the removal of poly(arylene sulfide) deposits from metal surfaces comprising contacting the deposits with at least one diaryl ether, represented by the general formula

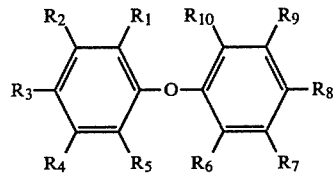

where $R_1$–$R_{10}$ represents hydrogen or an alkyl radical having from 1 to 4 carbon atoms with the total number of carbon atoms present in $R_1$–$R_{10}$ exceeding not more than about 20, under temperature conditions and for a period of time sufficient to remove said deposits.

2. A process according to claim 1 wherein said deposits are contacted with said diaryl ether at a temperature from about 200° C. to the boiling point of said diaryl ether for a time from about 0.5 hours to about 24 hours.

3. A process according to claim 2 wherein said temperature is from about 200° C. to about 400° C.

4. A process according to claim 1 wherein said metal surfaces subsequently are contacted with a $C_1$ to $C_5$ alcohol.

5. A process according to claim 4 wherein said metal surfaces are further washed water, dried, and then contacted with concentrated $HNO_3$.

6. A process for cleaning metal parts having poly(arylene sulfide) deposits thereon which comprises:

(a) contacting said part with at least one diaryl ether, represented by the general formula

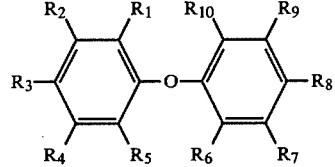

where $R_1$–$R_{10}$ represents hydrogen or an alkyl radical having from 1 to 4 carbon atoms with the total number of carbon atoms present in $R_1$–$R_{10}$ exceeding not more than about 20, under temperature conditions and for a period of time sufficient to remove said deposits;

(b) thereafter contacting the resulting ether treated part with a $C_1$ to $C_5$ alcohol;

(c) washing the metal part with water;

(d) drying the metal part; and (e) thereafter contacting the dried parts with concentrated $HNO_3$ followed by water washing and drying.

7. A process according to claim 6 wherein said poly(arylene sulfide) is poly(phenylene sulfide).

8. A process according to claim 6 wherein said diaryl ether is diphenyl ether.

9. A process according to claim 6 wherein said alcohol is methanol.

* * * * *